(12) United States Patent
Wills, II (10) Patent No.: US 8,276,577 B2
(45) Date of Patent: Oct. 2, 2012

(54) BOOM MOUNTED SAW (75) Inventor: Ronnie W. Wills, II, Cypress, TX (US)

(73) Assignee: Aggregate Technologies, Inc., Houston, TX (US)

( * ) Notice: Subject to any disclaimer, the term of this patent is extended or adjusted under 35 U.S.C. 154(b) by 621 days.

(21) Appl. No.: 12/508,451

(22) Filed: Jul. 23, 2009

(65) Prior Publication Data

US 2010/0018514 A1 Jan. 28, 2010

Related U.S. Application Data (60) Provisional application No. 61/084,247, filed on Jul. 28, 2008.

(51) Int. Cl.
*B28D 1/04* (2006.01)
(52) U.S. Cl. ..................... 125/13.01; 451/439
(58) Field of Classification Search ............... 125/13.01; 451/439, 438, 429, 415
See application file for complete search history.

(56) References Cited

U.S. PATENT DOCUMENTS

| | | | |
|---|---|---|---|
| 3,785,705 A | 1/1974 | Binger et al. | |
| 4,114,666 A | 9/1978 | Bruun | |
| 4,144,867 A * | 3/1979 | Wachs et al. | 125/14 |
| 4,180,047 A * | 12/1979 | Bertelson | 125/14 |
| 4,197,828 A * | 4/1980 | Schellhorn | 125/23.01 |
| 4,318,391 A * | 3/1982 | Wachs et al. | 125/14 |
| 4,327,703 A * | 5/1982 | Destree | 125/1 |
| 4,653,555 A | 3/1987 | Mellgren | |
| 4,779,654 A | 10/1988 | Casperson et al. | |
| 4,981,163 A | 1/1991 | Westlund | |
| 4,987,935 A | 1/1991 | Corcoran et al. | |
| 5,545,079 A * | 8/1996 | Larsson et al. | 451/342 |
| 6,026,869 A | 2/2000 | Holmes | |
| 6,371,177 B1 | 4/2002 | Larente | |
| 7,237,584 B2 | 7/2007 | DiSabatino | |
| 2007/0209651 A1 | 9/2007 | Ketterhagen et al. | |
| 2008/0017182 A1 | 1/2008 | Hilsgen | |

* cited by examiner

*Primary Examiner* — Robert Rose
(74) *Attorney, Agent, or Firm* — Patterson & Sheridan, L.L.P.

(57) ABSTRACT

A method and apparatus for a saw device mountable on a self-propelled piece of equipment, such as tractor, is described. In one embodiment, the saw device includes a gripper and cutter unit mountable on an articulatable arm or boom of the tractor. In one aspect, the gripper and cutter unit is coupled to a distal end of the boom by a frame, the frame being movable in at least an angle relative to a plane of the boom. The gripper and cutter unit comprises a material gripping device and an articulatable saw comprising a circular saw blade operably coupled to a motor, the saw blade and the motor coupled to a pivotable arm that is movable relative to the frame.

20 Claims, 5 Drawing Sheets

BOOM MOUNTED SAW

CROSS-REFERENCE TO RELATED APPLICATIONS

This application claims benefit of U.S. provisional patent application Ser. No. 61/084,247, filed Jul. 28, 2008, which is incorporated by reference herein.

BACKGROUND OF THE INVENTION

1. Field of the Invention

Embodiments of the invention relate to saw mountable on a self-propelled piece of equipment, such as tractor. More specifically, to a concrete saw mounted to a boom or retractable arm on a tractor, the concrete saw being articulatable relative to the boom or retractable arm.

2. Description of the Related Art

Cutting of reinforced concrete and masonry structures, such as walls, columns, beams and piles, typically requires precise cuts by skilled operators using a wall saw. In one conventional operation, a track is fastened to a portion of the structure to be cut to guide the wall saw during the cutting process. The fastening process includes drilling multiple holes in the structure and inserting anchors that are coupled between the structure and the track. The saw is then attached to the track and moved relative to the track to cut the structure.

The conventional cutting operation is time consuming and requires multiple operators. The track may need to be moved multiple times in order to complete a cut, which requires unbolting of the anchors from one portion of the structure and re-anchoring the track in the new portion of the structure. Safety is a factor as the portion to-be-cut must be suspended and/or secured to prevent the cut-off portion from falling or pinching the saw blade. Typically, a crane is used to suspend or secure the cut-off portion, which requires an additional operator.

In the case of cutting columns or piles having a thick, rectangular cross-section, track-mounted wall saws may require fastening to one surface, un-fastening from that surface and re-fastening along another surface to complete the cut, which is time-consuming. Additionally, conventional track mounted wall saws are not amenable to cutting irregular shaped objects, which require custom tracks and/or complicated positioning and repositioning of the track to complete the cut. Further, if the cutting operation takes place in a sub-surface location, suitable shoring must be implemented and permits are required before operators are allowed to enter the excavated area.

What is needed is a saw adapted to cut structures where the operator is remotely located from the cutting operation, a saw that requires less set-up time per cut and additionally reduces the number of operators needed.

SUMMARY OF THE INVENTION

A method and apparatus for an integrated gripper unit and saw device mountable on a self-propelled piece of equipment, such as tractor, is described. In one embodiment, a mobile cutting machine is described. The mobile cutting machine includes a tractor having a platform movably coupled to a drive mechanism, a boom coupled to the platform, and a gripper and cutter unit movably coupled to the boom, the gripper and cutter unit including a frame coupled to a distal end of the boom, the frame movable relative to the boom, a material gripping device coupled to the frame, a pivotable arm having a first end coupled to a shaft that is rotatable relative to the frame and the material gripping device, the pivotable arm having a second end that is at least movable in an arc relative to the first end, and a saw blade coupled to the second end of the pivotable arm, the saw blade being rotatable with the second end relative to the first end.

In another embodiment, an integrated gripper and cutter unit mountable on a tractor is described. The integrated gripper and cutter unit includes a frame having a first longitudinal axis, a material gripping mechanism disposed on the frame, a shaft movably coupled to the frame by one or more bearing blocks, the shaft having a second longitudinal axis disposed in a substantially parallel relationship with the first longitudinal axis and movable in a rotational axis defined about the second longitudinal axis, a pivotable arm having a first end and a second end defining a second longitudinal axis, the first end coupled to the shaft and the second end extending from the shaft, the second longitudinal axis being substantially normal to the first or second longitudinal axis, and a saw blade coupled to the second end of the pivotable arm, the saw blade being movable in the rotational axis relative to the frame.

In another embodiment, a method for cutting concrete or masonry materials is described. The method includes positioning a workpiece of concrete or masonry material in a gripping device coupled to a tractor, cutting a first side of the workpiece with a saw blade that is coupled to the gripping device, rotating the saw blade relative to the gripping device to contact a second side of the workpiece, and cutting the second side of the workpiece.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The invention generally provides a mobile cutting machine having an articulatable saw and integrated material gripping device mounted on a boom arm that is configured to move and or rotate in multiple directions and planes. The boom arm is coupled to a piece of heavy equipment adapted to move the boom and articulatable saw. The articulatable saw is adapted to cut hard materials as well as soft materials. Hard materials as used herein include aggregate structures, such as concrete and reinforced concrete and masonry, rock and other hard materials. In one embodiment, the articulatable saw is described as a gripping and cutting unit that is adapted to cut structures and suspend and/or secure a portion of the structure to be cut.

Figure 1:
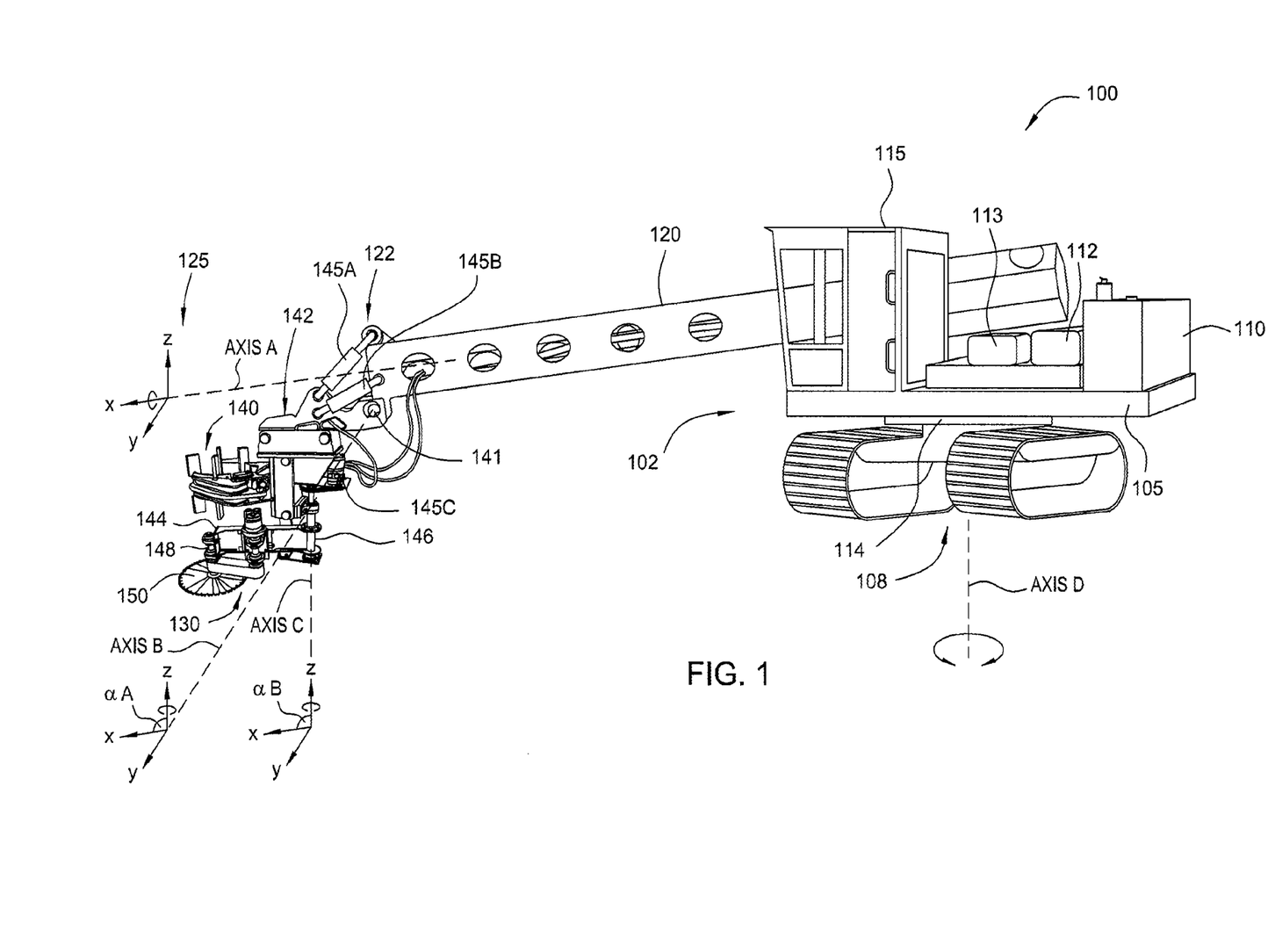
FIG. 1 is an isometric view of one embodiment of a mobile cutting machine.

FIG. 1 is an isometric view of one embodiment of a mobile cutting machine 100. The mobile cutting machine 100 includes a tractor 102 having a platform 105 mounted on a drive mechanism 108 adapted to move the tractor 102 along a surface. In this embodiment, the drive mechanism 108 includes a pair of tracks, but the drive mechanism 108 may alternatively be a plurality of wheels. The platform 105 is mounted to a ring gear 114 to operate as a turret that is rotatable relative to the drive mechanism 108. The platform 105 also supports an operator enclosure 115 and an articulatable and/or telescoping boom 120. The platform 105 also supports other equipment, such as an engine 110 that provides motive force to the drive mechanism 108. The engine 110 may also be coupled to a hydraulic pump or motor 112 that provides motive force to the boom 120 and facilitates rotation of the platform 105. The boom 120 is coupled to the platform 105 at a proximal end and a gripper and cutter unit 125 is shown operatively coupled to a distal end 122 of the boom 120. A tank 113 is also supported by the platform 105 that contains a cutting fluid that may be flowed to the gripper and cutter unit 125 during operation. The cutting fluid may be water or other fluid utilized to cool the saw blade 150 during a cutting operation. Optionally, the cutting fluid may be a fluid having abrasive particles interspersed therein to enhance cutting of material.

In one embodiment, the tractor 102 is a Gradall® machine having a boom 120 that moves vertically (Z direction), is extendable and retractable telescopically (X direction) and is laterally (Y direction) movable relative to the drive mechanism 108. In this embodiment, the boom 120 is capable of about 360° rotation about axis A such that the gripper and cutter unit 125 may be positioned at any radial position about axis A. In other embodiments, the tractor 102 may be a backhoe tractor, a trackhoe machine, or other machines having a crane device, a retractable arm or boom.

The gripper and cutter unit 125 includes an articulatable saw mechanism 130 and a material gripping mechanism 140 coupled to a frame 142. In one embodiment, the material gripping mechanism 140 is used to secure material to be cut by the articulatable saw mechanism 130. However, in some cutting applications, the material gripping mechanism 140 may not be utilized as the articulatable saw mechanism 130 coupled to the boom 120 by the frame 142 may be used to cut secured or supported materials or structures, such as rock, secured walls, ceilings, piles, columns as well as other secured or supported material which do not need to be held during cutting.

The frame 142 facilitates coupling of the articulatable saw mechanism 130 and the material gripping mechanism 140 to the distal end 122 of the boom 120. The frame 142 provides sufficient structural and mechanical support for the saw mechanism 130 and the material gripping mechanism 140 for holding and cutting material during a cutting operation. The frame 142 also allows the gripper and cutter unit 125 to be coupled as an integrated, operable unit to any form of boom or articulatable arm of a tractor 102. In this manner, the gripper and cutter unit 125 may be coupled to the tractor 102 for cutting and decoupled when not in use so that other implements may be used on the tractor 102.

The frame 142 is adapted to move angularly and/or rotationally relative to the distal end 122 of the boom 120. In some embodiments, the articulatable saw mechanism 130 is adapted to move angularly and/or rotationally relative to the frame 142 and/or the material gripping mechanism 140. The angular and/or rotational movement of the gripper and cutter unit 125 allows material to be gripped and/or cut as the structure is positioned without additional positioning, or allows the structure to be re-positioned and cut at a specific angle or orientation.

In one embodiment, the gripper and cutter unit 125 includes a pivoting mechanism 141 disposed between the distal end 122 of the boom 120 and the frame 142. The pivoting mechanism 141 may be a hinge device, a gimbal mechanism, a universal joint or other flexible joint allowing movement of the frame 142 in at least one direction relative to the distal end 122 of the boom 120. For example, one or more actuators 145A, 145B are coupled between the distal end 122 of the boom 120 and the frame 142 to provide motive force to move the frame 142 relative to the distal end 122 of the boom 120. The actuators 145A, 145B in this embodiment are hydraulic cylinders, although electrical drives and/or mechanical devices, such as gear devices or threaded mechanisms may alternatively be utilized.

In one embodiment, the actuator 145A is utilized to facilitate rotational movement of the frame 142 relative to the boom 120 about axis B. The actuator 145A provides a motive force to the frame 142 in order to tilt the frame 120 at an angle (shown as $\alpha$ A) relative to axis A (X direction). Alternatively or additionally, the actuator 145B may be used to provide rotational movement of the frame 142 such that the frame 142 is laterally pivotable relative to axis A (X direction). In one example, the gripper and cutter unit 125, which is coupled to the frame 142, is movable up and down relative to the distal end 122 of the boom 120 and/or side to side relative to the distal end 122 of the boom 120 utilizing one or a combination of actuators 145A and 145B.

In one aspect, the articulatable saw mechanism 130 is movable relative to the frame 142 and/or axis A. The articulatable saw mechanism 130 includes a pivotable arm 144 coupled to a shaft 146 at one end. The shaft 146 is coupled to the frame 142. An actuator 145C moves the shaft 146 and pivotable arm 144 relative to the frame 142. The pivotable arm 144 also includes a spindle 148 at an opposing end that is coupled to a rotatable cutting disk or saw blade 150. The actuator 145C provides rotational force to the shaft 146 to rotate the shaft 146 in axis C relative to the frame 142. Thus, the saw blade 150 coupled to the pivotable arm 144 is adapted to move in an arc relative to the frame 142 to facilitate positioning of the saw blade 150 and/or facilitate cutting of material or structures. Additionally or alternatively, the shaft 146 may be adapted to tilt at an angle (shown as $\alpha$ B) relative to the frame 142 to facilitate positioning of the saw blade 150 and/or facilitate cutting of material or structures.

In one embodiment, the material gripping mechanism 140 and articulatable saw mechanism 130 are movable relative to each other such that the material or a structure may be gripped at a first position or plane and cut by the articulatable saw mechanism 130 at a second position or plane that is different than the first position or plane. Thus, the articulatable saw mechanism 130 can be oriented to cut straight lines with the saw blade 150 oriented perpendicular to the surface of the material to be cut, or inclined at an angle relative to the surface of the material to be cut. Since the material is gripped by the material gripping mechanism 140 and the saw blade 150 is actuated to cut the gripped material relative to the material gripping mechanism 140, the cutting operation requires no tracks or guides to be anchored in the material or structure to be cut, which reduces operators and set-up time, and increases safety. Additionally, the material to be cut may be readily repositioned using the material gripping mechanism 140 to allow the saw blade 150 to make angular cuts, if desired.

In one embodiment, the platform 105 is adapted to move in a first rotational direction (on axis D) relative to the drive mechanism 108 by action of the ring gear 114. The rotation of the platform 105 rotates the boom 120 that extends therefrom in the Y direction. The boom 120 is independently movable relative to the platform 105 in a second rotational direction (on axis A in the X direction) and at least a Z direction. In one embodiment, the first rotational direction and the second rotational direction provides a full 360° range of movement to the gripper and cutter unit 125, which is coupled to the boom 120, around both axes A and D. Additionally, the direction of axis A may be controlled by changing the elevation (Z direction) and/or inclination (Y direction) of the boom 120 relative to the platform 105. Furthermore, since the boom 120 is telescopic, the position of the gripper and cutter unit 125 may be controlled in the X direction along axis A.

The gripper and cutter unit 125 is coupled by the frame 142 to the distal end 122 of the boom 120 and is adapted to rotate on axis B in at least an angle ($\alpha$ A) relative to axis A. In one embodiment, angle $\alpha$ A is between about 0° to about 45°.

The articulatable saw mechanism 130 is coupled to the frame 142 by a pivotable arm 144. The pivotable arm 144 rotates on axis C relative to the frame 142 so that the saw blade 150 is moved in a third rotational direction relative to the frame 142. The third rotational direction may be an arc or circular path on axis C. The third rotational direction about axis C allows the saw blade 150 to move relative to the gripping mechanism 140 so that the saw blade 150 may be advanced (e.g., cut) through material held by the material gripping mechanism 140.

In one embodiment, the saw blade 150 and the pivotable arm 144 are adapted to rotate on axis C in a full 360°. In another embodiment, the saw blade 150 and pivotable arm 144 are adapted to rotate on axis C in an arc of about 270° to about 320°. In another embodiment, the frame 142 is movable in a fourth rotational direction (angularly relative to axis B) relative to the boom 120 utilizing actuator 145B. In this embodiment, the fourth rotational direction provides lateral movement of the gripper and cutter unit 125 relative to the distal end 122 of the boom 120 in a range of movement between about 0° to about 180°.

Figure 2A:
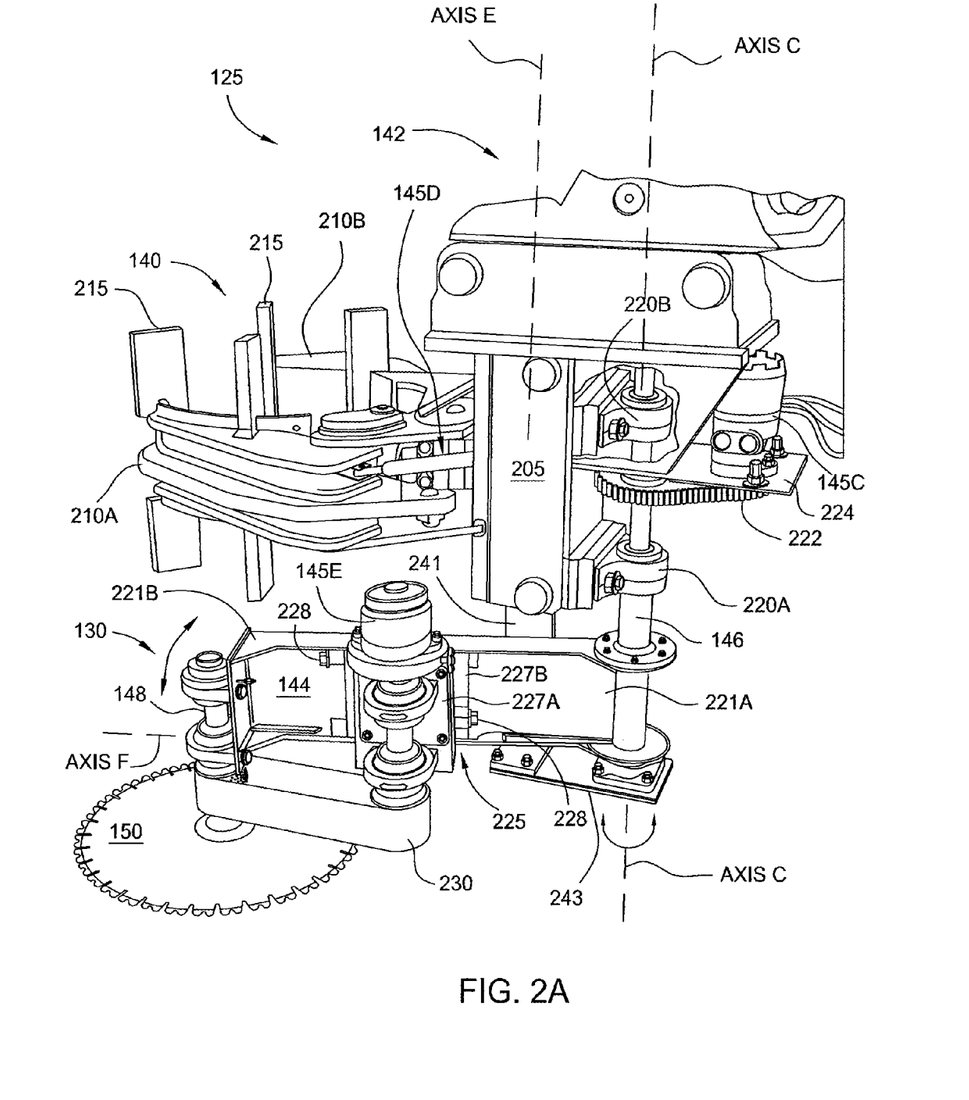
FIG. 2A is an isometric view of one embodiment of a gripper and cutter unit.

FIG. 2A is an isometric view of one embodiment of a gripper and cutter unit 125. In one embodiment, the gripper and cutter unit 125 includes the frame 142, which includes a structural body 205 having various structural parts that are coupled by pins, welds, fasteners, and combinations thereof to be utilized as a base or foundational structure for the frame 142. The body 205 provides sufficient structural and mechanical support for the saw mechanism 130 and the material gripping mechanism 140. The body 205 also allows the gripper and cutter unit 125 to be coupled as an integrated, operable unit to any form of boom or articulatable arm of a tractor, allowing ease of installation and removal from the boom or tractor.

The material gripping mechanism 140 includes at least two opposing arms 210A, 210B adapted to open and close to release and grip material therebetween. In order to provide the open/close movement, at least one of the arms 210A, 210B is movable relative to the body 205 and/or the other arm 210A, 210B. In one embodiment, the arms 210A, 210B are hingedly coupled to the body 205 by a framework and/or each other by a framework to allow the arms 210A, 210B to move towards and away from each other in a selective gripping/releasing manner. At least one actuator 145D, such as a hydraulic cylinder, is coupled between the body 205 and/or each arm 210A, 210B such that at least one of the arms 210A, 210B move relative to the body 205 and/or the other arm. Each of the arms 210A, 210B also include a plurality of transverse extended members 215 that are utilized to expand the gripping surface of the arms 210A, 210B.

The saw mechanism 130 is also coupled to the body 205 by the pivotable arm 144. In this embodiment, the pivotable arm 144 is coupled the body 205 by a shaft 146 extending through one or more bearing blocks 220A, 220B. In one embodiment, the shaft 146 is coupled to the pivotable arm 144 while the bearing blocks 220A, 220B are fastened to the body 205, or vice versa. An actuator 145C is disposed on a base 224 of the body 205 and is operably coupled to the shaft 146 to control the rotation of the pivotable arm 144. The shaft 146 is rigidly coupled to a first end 221A of the pivotable arm 144 such that a motive force from the actuator 145C rotates the shaft on axis C and causes a second end 221B of the pivotable arm 144 to rotate about axis C in an arc or circular motion.

In one embodiment, the body 205 includes an extended brace or structural member 241 that is coupled between the body 205 and a base plate 243 along the longitudinal axis of the body 205 (axis E). In this embodiment, the base plate 243 is coupled to the shaft 146 below the pivotable arm 144 and the base plate 243 is coupled to the body 205 by the structural member 241. The structural member 241 may add additional mechanical rigidity to the articulatable saw mechanism 130 by providing additional mechanical support for the shaft 146. In this embodiment, the base plate 243 may be utilized as a stand or pad that may be used to support the gripper and cutter unit 125 on the ground when the gripper and cutter unit 125 is not in use. In one aspect, the structural member 241 functions as a mechanical stop that prevents movement of the pivotable arm 144 past axis E, which minimizes or prevents contact between the material to be cut and portions of the pivotable arm 144 and/or saw blade 150. In one example, the structural member 241 may be configured to prevent movement of the second end 221B of the pivotable arm 144 into a surface of the material to be cut. In this manner, the second end 221B and/or the shaft 148 connected to the saw blade 150 are prevented from contacting the material during the cutting operation. In one embodiment, the structural member 241 prevents movement of the pivotable arm 144 in an area adjacent the structural member 241 that is between about 5° and about 40°. While movement is limited adjacent the structural member 241, the pivotable arm 144 is free to move in an arc between about 355° to about 320° about axis C.

The actuator 145C is coupled to the shaft 146 by a linkage 222, which may be a belt, a chain or other transmission member. The actuator 145C may be a hydraulic motor, a gear motor, an electric motor, or other actuator that may be utilized to control the rotation of the shaft 146. In one embodiment, the actuator 145C is coupled to the shaft 146 by a belt and pulley or sprocket device that rotates the shaft 146 and pivotable arm 144 about axis C. The saw blade 150, which is coupled to the second end 221B of the pivotable arm 144, is thus moved at least in an arcing or circular motion relative to the body 205 and/or the gripping mechanism 140 by the actuator 145C.

The saw mechanism 130 also includes an actuator 145E coupled to the pivotable arm 144 and the saw blade 150. The actuator 145E is operably coupled to the saw blade 150 to spin the saw blade 150 relative to the pivotable arm 144. In one embodiment, the saw blade 150 is fastened to the spindle 148 that extends from the second end 221B of the pivotable arm 144. The actuator 145E is coupled to the spindle 148 by a linkage 230. The linkage 230, which may be a belt, a chain or other transmission member. The actuator 145E may be a hydraulic motor, a gear motor, an electric motor, or other suitable rotational motor or drive. In one embodiment, the actuator 145E is coupled to the spindle 148 by a belt and pulley or sprocket device that rotates the spindle 148 to spin the saw blade 150 at a rotational velocity suitable for cutting material.

The actuator 145E is coupled to an adjustment device 225 to adjust the tension of the flexible linkage 230. In one embodiment, the adjustment device 225 includes a movable base 227A movably coupled to a fixed base 227B that is fastened to the pivotable arm 144. One or more fasteners 280, such as bolts, nuts, set screws, and combinations thereof are coupled between the movable base 227A and fixed base 227B. The one or more fasteners 280 may be appropriately rotated to adjust a distance between the rotational axis of the actuator 145E and the spindle 148 to adjust the tension of the flexible linkage 230.

The one or more bearing blocks 220A, 220B generally maintain the longitudinal axis of the shaft 146 (axis C) in a parallel relationship with a longitudinal axis of the body 205, shown as axis E. Thus, a longitudinal axis of the pivotable arm 144, shown as axis F, is coupled in a substantially orthogonal relationship with axis E. Likewise, the saw blade 150 is coupled to the pivotable arm 144 in a substantially orthogonal relation to axis F. In this embodiment, the coupling arrangement of the bearing blocks 220A and/or 220B maintain the pivotable arm 144 and the saw blade 150 in an arc that is substantially normal to axis D when the shaft 146 is rotated by the actuator 145C.

Figure 2B:
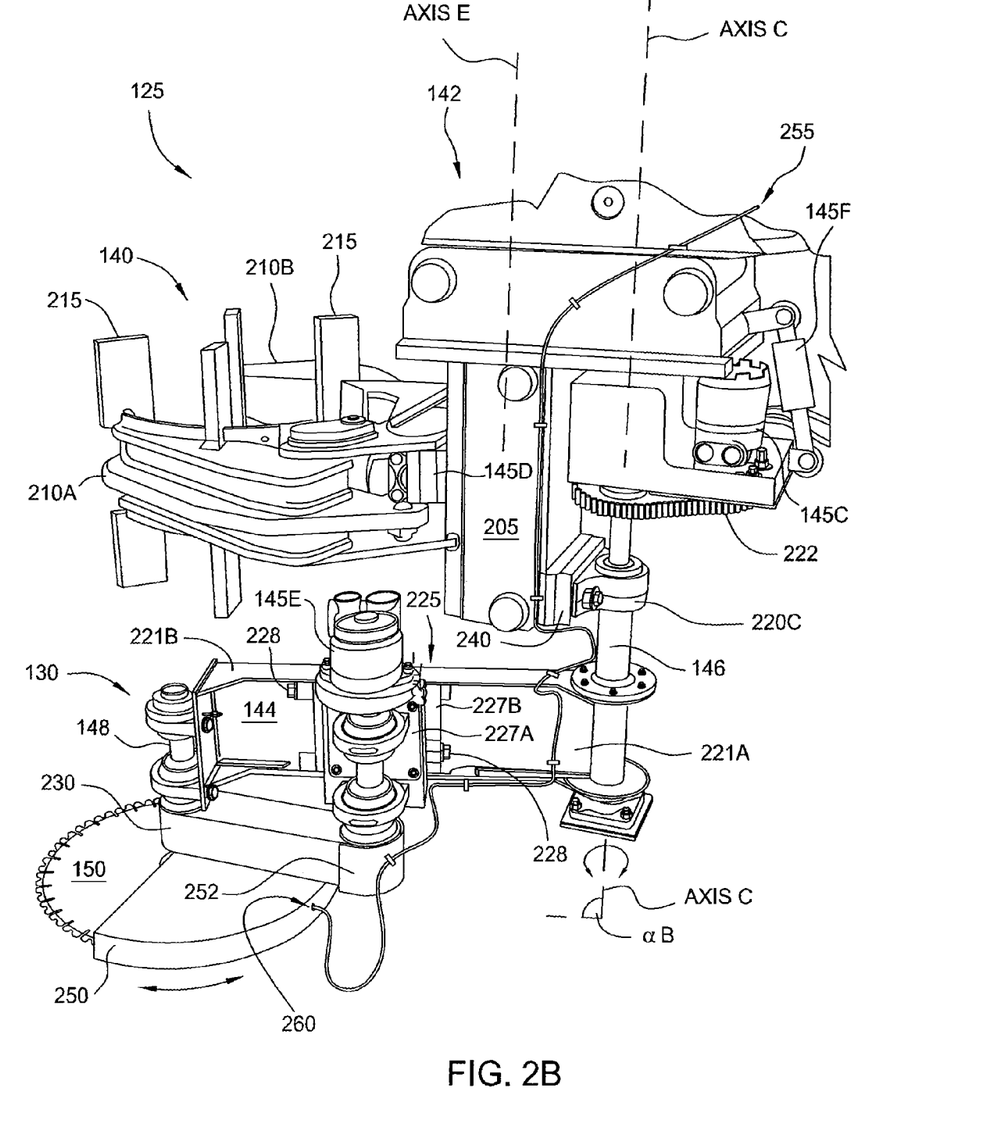
FIG. 2B is an isometric view of another embodiment of a gripper and cutter unit.

FIG. 2B is an isometric view of another embodiment of a gripper and cutter unit 125. The gripper and cutter unit 125 shown in FIG. 2B is substantially similar to the gripper and cutter unit 125 shown in FIG. 2A, with the exception of one or more guards 250, 252, a coolant conduit 255, and an additional actuator 145F adapted to provide another angular or rotational aspect to the saw mechanism 130. Additionally, the structural member 241 shown in FIG. 2A is removed, which allows full rotation of the pivotable arm 144 and saw blade 150 about axis C.

In this embodiment, the bearing block 220C is movably coupled the body 205 and allows the shaft 146 to move at an angle (α B) so that the orientation of axis C relative to the body 205 and axis E may be changed. For example, in the embodiment shown in FIG. 2A, the longitudinal axis of the shaft 146 (axis C) is generally parallel to axis E. However, in this embodiment, longitudinal axis of the shaft 146 (axis C) may be moved between a parallel and a non-parallel position relative to axis E. Thus, the saw blade 150 may be adjusted angularly relative to axis E enabling angular cuts without utilizing other actuators (e.g., 145A, 145B) and/or moving the boom 120 or tractor 102 (both not shown). In this embodiment, the shaft 146 is coupled to the body 205 by or through the bearing block 220C that is coupled to the body 205 by a hinge mechanism 240. The base 224 is coupled to the actuator 145F, which may be a hydraulic cylinder that is actuated to move the shaft 146 and the attached pivotable arm 144 relative to the body 205 within angle α B. In one embodiment, the angle α B may be between about 0° to about 30°. Thus, an additional angular aspect is provided on the saw mechanism 130, which may facilitate angular cuts on material or structures. For example, a beveled cut may be made on a piece of material with or without the use of the gripping mechanism 140. In the case where the gripping mechanism 140 is utilized, the material may not need to be positioned and gripped at a specific orientation to allow an angular cut to be made and, instead, the saw mechanism 130 may be angled relative to the material.

In this embodiment, a fluid conduit 255 is coupled to a blade guard 250 that covers at least a portion of the saw blade 150. The fluid conduit 255 may be a flexible tube, such as a hose, that is in communication with the tank 113 (shown in FIG. 1) and provides fluid used for cooling the saw blade 150 and/or an abrasive slurry for enhancing cutting efficiency. In another alternative, the fluid conduit 255 may be rigid tubing coupled with rotatable fluid seals (not shown) that allow flexibility in the fluid conduit 255.

In one embodiment, the blade guard 250 covers roughly half of the diameter of the saw blade 150 to prevent workers from inadvertently coming in contact with the saw blade 150 and/or to prevent debris from flying away from the saw blade 150 during a cutting operation. The blade guard 250 is movable relative to the saw blade 150 such that the blade guard 250 may be moved to different positions relative to the saw blade 150. The blade guard 250 may be rotated to expose a different edge of the saw blade 150 and locked into position by set screws or a friction device such that the blade guard 250 does not move relative to the saw blade 150 during a cutting operation. In one embodiment, the blade guard 250 is coupled to a support member (not shown) disposed on the second end 221B of the pivotable arm 144 and the support member provides rotational movement of the blade guard 250 relative to the pivotable arm 144 and the saw blade 150. In another embodiment, the blade guard 250 is coupled to a tube or bearing (not shown) disposed around the shaft 148 between the flexible linkage 230 and the saw blade 150. In this embodiment, the tube or bearing allows the saw blade 150 and/or shaft 148 to rotate without rotating the blade guard 250. Likewise, rotation of the blade guard 250 does not rotate the saw blade 150.

The fluid conduit 255 is coupled to the blade guard 250 by an inlet 260 that directs a fluid through the blade guard 250 and into contact with the saw blade 150. The coolant may be water, an abrasive-laden fluid, or other cutting fluid. The fluid conduit 255 may be fastened to the body 205 and the pivotable arm 144 in a manner that prevents portions of the fluid conduit 255 from coming into contact with moving parts. Additionally, the fluid conduit 255 has sufficient length to allow the pivotable arm 144 to move relative to the body 205 without breaking and/or pulling the fluid conduit away from the guard blade 250. Likewise, the portion of the fluid conduit 255 adjacent the blade guard 250 has a sufficient length to allow movement of the blade guard 250 while maintaining communication between the fluid conduit 255 and the inlet 260. The fluid conduit 255 may be coupled to the blade guard 250 at any location, such as on an upper surface or lower surface of the blade guard 250, or the side of the blade guard 250 as shown. As the environment where the mobile cutting machine 100 operates is relatively clean or free from falling debris, the fluid conduit 255 may include loose portions and/or exposed portions with minimal chances of being torn or pulled.

In one embodiment, the saw blade 150 is capable of movement relative to the frame 142 or body 205 to perform a cutting operation without the need to move the tractor 102 or the boom 120. Therefore, material may be gripped and/or positioned prior to actuating the saw blade 150. Once the material is gripped, the saw blade 150 may be actuated to cut the material. The pivotable arm 144 moves the saw blade 150 to cut into and/or through the gripped material while the tractor 102, the frame 142, and the boom 120 are stationary and may remain stationary during the cutting operation.

FIGS. 3A-3F are schematic top views of the gripper and cutter unit 125 shown in FIGS. 2A and 2B depicting one embodiment of a cutting sequence on a piece of material 300 shown in cross-section. The piece of material 300 is shown gripped between the two arms 210A, 210B of the gripping mechanism 140. In this embodiment, the cross-section of the piece of material 300 is shown as rectangular for clarity but it is understood that material in other shapes may be cut and gripped. For example, the piece of material may be circular or other polygonal shapes, and may additionally include an irregular shape or irregular outer surface.

Figure 3A:
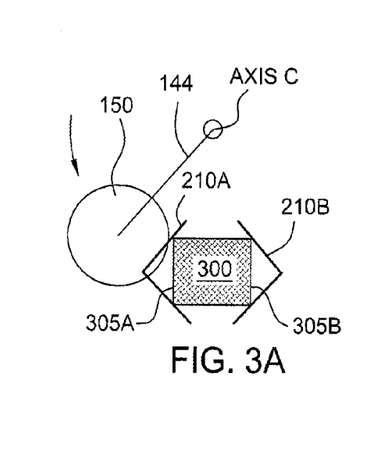
FIGS. 3A-3F are a schematic top views of the gripper and cutter unit shown in FIGS. 2A and 2B depicting one embodiment of a cutting sequence on a piece of material.
Figure 3B:
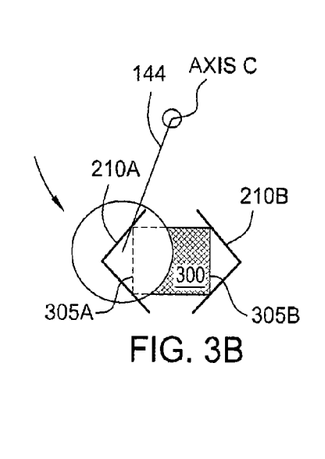
Figure 3C:
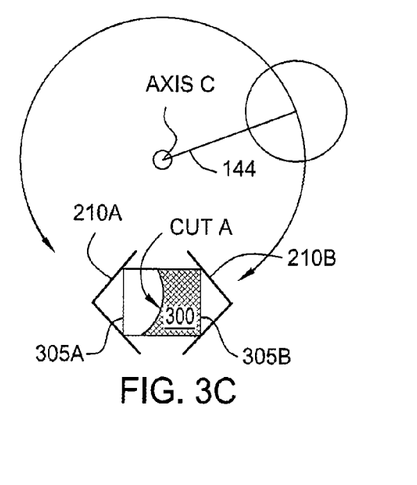

In this embodiment, a two-step cutting sequence is shown using the gripper and cutter unit 125. In FIGS. 3A-3C, a first cut, shown as cut A, is made by advancing the saw blade 150 through a first side 305A of the piece of material 300. The saw blade 150 is advanced in a pivoting counterclockwise motion within axis C to a first depth that may include a cut depth into the piece of material 300 to a position where the leading edge of the saw blade 150 is beyond the centerline of the piece of material 300. In one embodiment, the first depth coincides with a mechanical limit of the saw mechanism 130. For example, the pivotable arm 144 may encounter a support member 241 (shown in FIG. 2A) coupled to the gripper and cutter unit 125 that functions as a mechanical stop and precludes movement of the pivotable arm 144 past a particular point along the arc within axis C. In another example, a portion of the pivotable arm 144 and/or the shaft 148 may come into contact with the first side 305A of the material 300 such that advancement of the saw blade 150 is precluded.

Figure 3D:
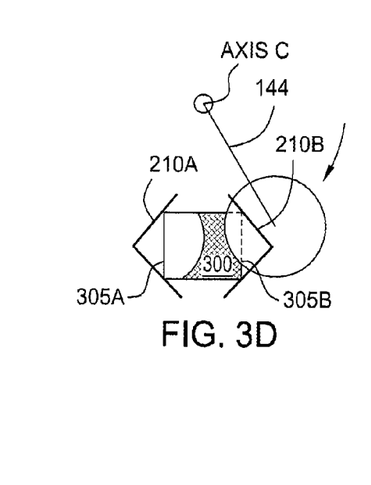
Figure 3E:
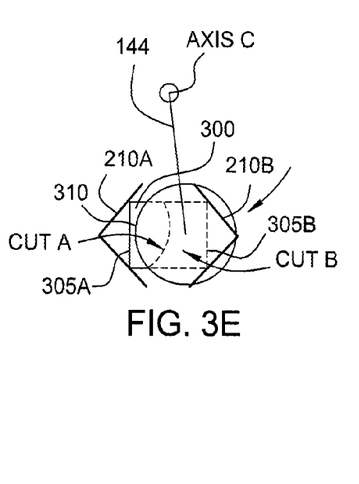
Figure 3F:
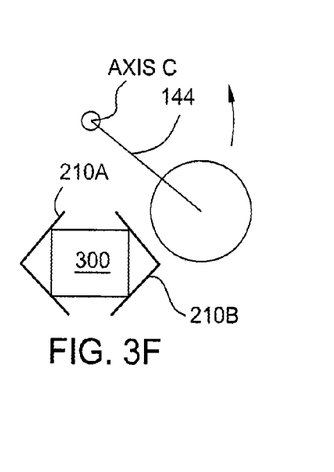

After the leading edge of the saw blade 150 has reached the first depth, the rotation of the saw blade 150 within axis C is reversed such that the saw blade 150 is rotated clockwise within axis C to a second side 305B of the piece of material 300 to begin a second cut as shown in FIGS. 3C and 3D. The second cut includes urging the saw blade 150 into the second side 305B of the piece of material 300 in a pivoting clockwise motion within axis C to a second depth in order to complete the cut of the piece of material 300, as shown in FIG. 3E. In this embodiment, the second depth includes rotating the saw blade 150 in an arc until a leading edge 310 reaches or goes beyond the cut A as shown in FIG. 3E. In one embodiment, the second depth includes a cut depth into the piece of material 300 to a position where the leading edge 310 of the saw 150 is beyond the centerline of the piece of material 300. After the cuts A and B are complete, the piece of material 300 is cut into two discrete portions, and the saw blade 150 may be rotated away from the piece of material 300 that is held by the arms 210A, 210B, as shown in FIG. 3F.

Figure 4:
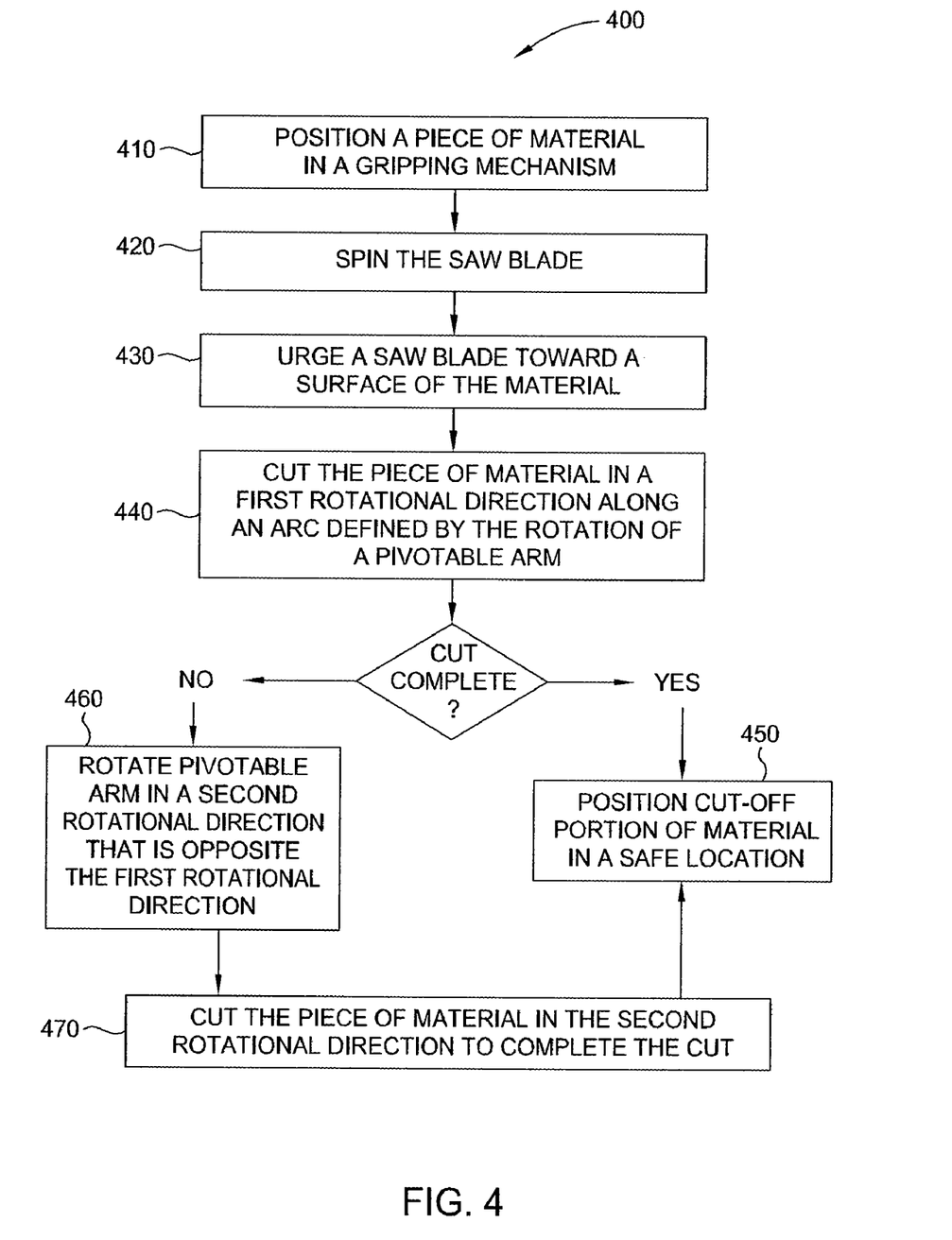
FIG. 4 is a flowchart showing one embodiment of a method using the gripper and cutter unit as described herein.

FIG. 4 is a flowchart showing one embodiment of a method 400 using the mobile cutting machine 100 having the gripper and cutter unit 125 as described herein. In this embodiment, a material cutting and handling method is described for use in cutting a discrete piece of concrete or masonry material that is capable of being gripped and supported by the gripping mechanism 140. An example of a discrete piece of material may be a column or pile, which is shown in cross-section in FIG. 3, although other embodiments may be implemented where the gripping mechanism 140 is not utilized or needed.

At 410, a piece of material to-be-cut is positioned in the gripping mechanism 140. The piece of material may be a substantially vertically oriented post, column or pile that is attached to the ground or a post, column or pile attached to another structure. In another embodiment, the piece of material may be a discrete post, column or pile that is laying on the ground or another structure, or in some other non-vertical orientation. The piece of material may be easily accessed by the mobile cutting machine 100 and gripped using the gripper and cutter unit 125. Additionally, the piece of material may be moved to another location by the mobile cutting machine 100 if not attached to the ground or another structure. At 420, the saw blade 150 is actuated to spin or rotate at a suitable speed and the saw blade 150 is urged against the surface of the material to cut the material. After the piece of material is suitably secured by the gripping mechanism 140 and the saw blade 150 is spinning, the saw blade 150 is moved toward a surface of the material at 430.

At 440, the piece of material is cut in a first rotational direction (e.g. clockwise or counterclockwise) along an arc defined by the rotation of the pivotable arm 144. Depending on the diameter of the saw blade 150, depth of the cut and/or the thickness of the material, the cut made at 440 may completely sever the material and complete the cut. If the cut is complete, the cut-off portion of the piece of material that is secured in the gripping mechanism 140 may be transported and/or positioned in a safe location, as shown at 450.

If the cut is not complete, the saw blade 150 may be rotated in a second rotational direction (e.g. opposite the first rotational direction at 440) along the arc defined by the rotation of the pivotable arm 144 at 460. At 470, the piece of material is cut in the second rotational direction to a depth that breaks into the first cut so that the piece of material is severed. The cut-off portion of the piece of material that is secured in the gripping mechanism 140 may be transported and/or positioned in a safe location, as shown at 450.

The mobile cutting machine having the articulatable saw as described herein has proven to be commercially valuable by lessening the number of operators needed for a cutting operation, reducing the time required for the cutting operation, and providing a safer working environment for the operator. Additionally, the mobile cutting machine having the articulatable saw as described herein allows materials to be cut below grade without a need for an operator to enter the bellhole or excavation. This reduces costs of permits and shoring while dramatically increasing safety.

EXAMPLE

The mobile cutting machine having the articulatable saw was transported to a worksite and utilized to cut numerous reinforced concrete piles to length. The pile cutting job was shared by a competitor using a conventional track-mounted wall saw. The competitor supplied two operators for the saw, a crane and crane operator to support and secure the concrete piles during cutting, and remove the detached portion of the pile after cutting. The mobile cutting machine only required a single operator to secure, cut and remove detached portions after cutting.

In one hour, the competitor completed cutting of about 4 piles while the mobile cutting machine completed cutting of about 18 piles. Thus, the mobile cutting machine as described herein effected a 400% increase in the number of concrete piles cut over the conventional method with a 60% reduction in man-hours. Moreover, safety at the work-site was dramatically increased as the single operator was protected by the cab of the mobile cutting machine during the cutting operation while the conventional saw operators remained in close proximity to the spinning saw and cutting debris.

The mobile cutting machine as described herein performs the work of three machines and replaces numerous operators with a single operator. The inventive machine holds material to-be-cut in place, cuts the material at any angle, and safely removes the detached material. The mobile cutting machine having the articulatable saw as described herein has proven to be commercially viable by lessening the number of operators needed for a cutting operation, reducing the time required for the cutting operation, and providing a safer working environment for the operator. The mobile cutting machine not only cuts material faster than traditional methods but it also performs the work safer. The single operator is removed from the cutting location and is protected by the cab of the machine. This limits the amount of flying debris accidents, removes the chance of operator injury from handling equipment and reduces accidents and/or mishaps.

While the foregoing is directed to embodiments of the invention, other and further embodiments of the invention may be devised without departing from the basic scope thereof.

What is claimed is:

1. A mobile cutting machine, comprising:
   a tractor having a platform movably coupled to a drive mechanism;
   a boom coupled to the platform; and
   a gripper and cutter unit movably coupled to the boom by a pivot mechanism, the gripper and cutter unit comprising:
      a frame coupled to the pivot mechanism, the frame being movable relative to the boom;
      a material gripping device coupled to the frame;
      a pivotable arm having a first end coupled to a shaft that is rotatable relative to the frame and the material gripping device, the pivotable arm having a second end that is at least movable in an arc relative to the first end; and
      a saw blade coupled to the second end of the pivotable arm, the saw blade being rotatable with the second end relative to the first end.

2. The machine of claim 1, wherein the gripper and cutter unit further comprises:
   a drive motor mounted on the pivotable arm and operably coupled to the saw blade.

3. The machine of claim 2, wherein the drive motor is coupled to the saw blade by a belt.

4. The machine of claim 2, wherein the drive motor is coupled to a tensioning device that is adjustable relative to the pivotable arm.

5. The machine of claim 1, wherein the gripper and cutter unit further comprises: one or more bearing blocks coupling the shaft to the frame.

6. The machine of claim 5, wherein the gripper and cutter unit further comprises:
   an actuator disposed on the frame and operably coupled to the shaft for rotating the shaft and the pivotable arm relative to the frame.

7. The machine of claim 1, wherein the gripper and cutter unit further comprises:
   a structural member extending from the frame and aligned with a longitudinal axis of the frame, the structural member preventing movement of the pivotable arm in at least a portion of the arc.

8. The machine of claim 1, wherein the gripper and cutter unit further comprises:
   a blade guard at least partially surrounding the saw blade.

9. The machine of claim 8, wherein the blade guard is movable relative to the saw blade.

10. The machine of claim 1, wherein the gripper and cutter unit further comprises:
    a fluid conduit coupled to the frame and in communication with the saw blade.

11. An integrated gripper and cutter unit mountable on a tractor, comprising:
    a frame having a first longitudinal axis;
    a material gripping mechanism disposed on the frame, the material gripping mechanism comprising two arms that are hingedly coupled to the frame and providing movement of at least one of the two arms relative to the frame;
    a shaft movably coupled to the frame by one or more bearing blocks, the shaft having a second longitudinal axis disposed in a substantially parallel relationship with the first longitudinal axis and movable in a rotational axis defined about the second longitudinal axis;
    a pivotable arm having a first end and a second end defining a third longitudinal axis, the first end coupled to the shaft and the second end extending from the shaft, the third longitudinal axis being substantially normal to the first or second longitudinal axis; and
    a saw blade coupled to the second end of the pivotable arm, the saw blade being movable in the rotational axis relative to the frame.

12. The gripper and cutter unit of claim 11, further comprising:
    a blade guard at least partially surrounding the saw blade.

13. The gripper and cutter unit of claim 12, wherein the blade guard is rotatable relative to the saw blade.

14. The gripper and cutter unit of claim 11, wherein the gripper and cutter unit further comprises:
    a fluid conduit coupled to the frame and in communication with the saw blade.

15. The gripper and cutter unit of claim 11, wherein the gripper and cutter unit further comprises:
    a structural member extending from the frame and aligned with the first longitudinal axis, the structural member preventing movement of the pivotable arm in at least a portion of the rotational axis.

16. A method for cutting concrete or masonry materials, comprising:
    positioning a workpiece of concrete or masonry material in a gripping device that is hingedly mounted to a frame, the frame being movably coupled to a tractor;
    cutting a first side of the workpiece with a saw blade that is disposed on a distal end of a pivotable arm, the pivotable arm being rotationally coupled to the frame;
    rotating the pivotable arm relative to the frame to position the saw blade to contact a second side of the workpiece; and
    cutting the second side of the workpiece.

17. The method of claim 16, wherein cutting the first side comprises rotating the pivotable arm in a first rotational direction.

18. The method of claim 17, wherein cutting the second side comprises rotating the pivotable arm in a second direction that is opposite the first rotational direction.

19. The method of claim 17, wherein at least a portion of the workpiece is below grade and the cutting is performed in an excavated area around the workpiece.

20. The method of claim 17, wherein the workpiece is attached to the ground or another structure that is attached to the ground.

* * * * *

UNITED STATES PATENT AND TRADEMARK OFFICE
CERTIFICATE OF CORRECTION

PATENT NO. : 8,276,577 B2  
APPLICATION NO. : 12/508451  
DATED : October 2, 2012  
INVENTOR(S) : Wills, II It is certified that error appears in the above-identified patent and that said Letters Patent is hereby corrected as shown below:

Title Page, Assignee (73):

Delete "Aggregate Technologies, Inc., Houston, TX (US)".

Signed and Sealed this
Seventeenth Day of September, 2013

Teresa Stanek Rea
*Deputy Director of the United States Patent and Trademark Office*